United States Patent
Mirzaei et al.

(10) Patent No.: US 10,301,531 B2
(45) Date of Patent: May 28, 2019

(54) MODIFIED NATURAL POLYMERS AS BITUMEN ENCAPSULANTS

(71) Applicant: UNIQUEM INC., Calgary (CA)

(72) Inventors: Amir Mirzaei, Calgary (CA); Hirbod Rad, Calgary (CA)

(73) Assignee: UNIQUEM INC., Calgary (CA)

( * ) Notice: Subject to any disclaimer, the term of this patent is extended or adjusted under 35 U.S.C. 154(b) by 0 days.

(21) Appl. No.: 15/741,055

(22) PCT Filed: Jul. 23, 2015

(86) PCT No.: PCT/CA2015/050691
§ 371 (c)(1),
(2) Date: Dec. 29, 2017

(87) PCT Pub. No.: WO2017/011894
PCT Pub. Date: Jan. 26, 2017

(65) Prior Publication Data
US 2018/0187065 A1   Jul. 5, 2018

(51) Int. Cl.
| | |
|---|---|
| *E21B 21/00* | (2006.01) |
| *E21B 7/14* | (2006.01) |
| *C09K 8/08* | (2006.01) |
| *C09K 8/524* | (2006.01) |
| *C09K 8/035* | (2006.01) |
| *C08B 11/02* | (2006.01) |
| *C08B 37/00* | (2006.01) |
| *C09K 8/592* | (2006.01) |
| *E21B 43/24* | (2006.01) |

(52) U.S. Cl.
CPC .............. *C09K 8/524* (2013.01); *C08B 11/02* (2013.01); *C08B 37/0087* (2013.01); *C08B 37/0096* (2013.01); *C09K 8/035* (2013.01); *C09K 8/08* (2013.01); *E21B 21/00* (2013.01); *C09K 8/592* (2013.01); *E21B 43/24* (2013.01)

(58) Field of Classification Search
CPC .......... C09K 8/035; C09K 8/08; C09K 8/524; E21B 21/00; E21B 21/003; E21B 33/138
See application file for complete search history.

(56) References Cited

U.S. PATENT DOCUMENTS

| | | |
|---|---|---|
| 5,597,783 A | 1/1997 | Audibert et al. |
| 8,138,124 B2 | 3/2012 | Kakadjian et al. |
| 2010/0036114 A1 | 2/2010 | Baldaro et al. |
| 2012/0028853 A1 | 2/2012 | Masikewich |

FOREIGN PATENT DOCUMENTS

| | | |
|---|---|---|
| CA | 959368 A | 12/1974 |
| CA | 2135087 A1 | 6/1995 |
| CA | 2290361 A1 | 10/1999 |
| CA | 2817651 A1 | 12/2013 |
| CA | 2899356 A1 | 8/2014 |
| CA | 2847947 A1 | 9/2014 |

OTHER PUBLICATIONS

International Search Report of the corresponding PCT International Application PCT/CA2015/050691 dated Mar. 16, 2016.

*Primary Examiner* — Zakiya W Bates
(74) *Attorney, Agent, or Firm* — Platinum Intellectual Property LLP

(57) ABSTRACT

An anti-accretion drilling fluid additive comprising at least one of a hydrophobically modified natural polysaccharide and hydrophobically modified and chemically derivatized polysaccharide; and whereby said additive acts as a bitumen encapsulant to provide a barrier against bitumen accretion during drilling in steam assisted gravity drainage (SAG) operations.

20 Claims, 4 Drawing Sheets

MODIFIED NATURAL POLYMERS AS BITUMEN ENCAPSULANTS

FIELD OF THE INVENTION

The present invention is directed to the use of a polymer in an aqueous drilling fluid for steam assisted gravity drainage (SAGD) operations. More specifically, it is directed to the use of hydrophobically modified polysaccharides and derivatized polysaccharides in SAGD drilling fluids.

DESCRIPTION OF THE RELATED ART

Oil sand deposits are found predominantly in the Middle East, Venezuela, and Western Canada. The term "oil sands" refers to large subterranean land formations composed of reservoir rock, water and heavy oil and/or bitumen. The Canadian bitumen deposits, being the largest in the world, are estimated to contain between 1.6 and 2.5 trillion barrels of oil.

Bitumen is a heavy, black oil which, due to its high viscosity, can not readily be pumped from the ground like other crude oils. Therefore, alternative processing techniques are used to extract the bitumen deposits from the oil sands. The basic principle of known extraction processes is to lower the viscosity of the bitumen by applying heat, injecting chemical solvents, or a combination thereof, to a deposit layer of bitumen, thereby promoting flow of the material throughout the treated reservoir area, in order to allow for recovery of bitumen from that layer.

At present there are two main methods that are used to recover bitumen from the oil sands. One of the methods is truck and shovel surface mining for subsequent extraction, and the other is steam assisted gravity drainage (SAGD). SAGD is used when the depth of the bitumen formation, such as in the Fort McMurray formation in Canada, is too deep to access and retrieve via the truck and shovel method. In SAGD, two horizontal wells are drilled, one on top of the other with approximately 5 meters spacing therebetween. The shallower horizontal well, or injection well, is used to pump steam into the bitumen formation in order to treat and soften the bitumen to make it flowable. The deeper horizontal well, or production well, collects the heated bitumen for pumping to the surface. SAGD, as with most recovery strategies, is focused on increasing bitumen temperature within a limited region around a steam injection well. The reduced-viscosity oil is then allowed to flow by gravity drainage to an underlying point of the reservoir for collection by a horizontal production well. The heavy oil/bitumen is then brought to the surface for further processing.

In the course of SAGD drilling operations, the drill string and/or other equipment come into contact with zones of rock and/or soil containing bitumen. Inevitably, bitumen, being a relatively sticky substance readily adheres to any surface that it contacts, including the surfaces of the wellbore and/or any equipment utilized during the drilling operations. If a sufficient amount of bitumen adheres to surfaces in the wellbore or drilling equipment, it may, among other things, prevent the drill string from rotating, prevent fluid circulation, or otherwise impede the effectiveness of a drilling operation. In some cases, it may become necessary to remove and/or disassemble the drill string in order to remove accretions of bitumen, a process which may create numerous cost and safety concerns. The accretion of bitumen on drilling equipment and/or in the wellbore also can impede any subsequent operations down hole, including cementing, acidizing, fracturing, sand control, and remedial treatments.

Additives are commonly used with drilling fluid systems as an attempt to combat bitumen accretion when drilling in bitumen-containing formations. For example, water-based drilling fluids that contain solvents or wetting agents as anti-accretion additives intended to limit bitumen accretion to metal surfaces are disclosed in Canadian Patent Nos. 2,454,312; 2,481,543; 2,451,585 and 2,437,522. These solvent and/or surfactant systems rely on the solvent's ability to dissolve bitumen. However, this approach limits the number of wells that can be drilled before the drilling fluid must be stripped of the built-up bitumen.

Other prior art anti-accretion drilling fluid additives in use consist of polymers such as non-ionic, cationic and hydrophobically associating polymers. These polymer additives are believed to prevent accretion of the bitumen, or heavy oil, to metal surfaces via an encapsulation mechanism that involves the formation of an ion pair between the cationic functionalities on the encapsulating polymer and the negative charges found in the composition of bitumen. This mechanism is supported by the experimental observation that polymers with increasing cationic charge provide better encapsulating and anti-accretion properties. Exemplary encapsulation systems are disclosed in Canadian Patent Nos. 2,508,339; 2,624,834 and 2,635,300.

Certain prior art drilling fluids that include a cationic polymer have the disadvantage that they can be incompatible with other drilling fluid additives used as viscosifiers. More specifically, the cationic polymer can coagulate polymers added as viscosifiers and decrease the overall viscosity and carrying capacity of the drilling fluid. This is particularly problematic in horizontal wells such as those drilled in SAGD operations. In addition, certain prior art drilling fluids that contain a non-ionic polymer do not perform well in certain formations and may not prevent accretion on drilling equipment to a satisfactory degree.

Encapsulation of bitumen through synthetic polymers has gained widespread acceptance as an efficient solution for this problem. Various synthetic polymers have been used or proposed for the prevention of bitumen accretion. For example, one approach involves the use of a hydrophobic group of hydrophobically associating polymers in oilfield applications. For example, the hydrophobic group of hydrophobically associating polymers is used as a viscosifier in enhanced oil recovery (polymer flooding), and as an acid stimulation additive and as a drag reducing agent in drilling/completion fluids, as described in Han et al. Soc. of Petroleum Engineers, 104432, pp. 1-6, 2006 and in Taylor K. C. et al. Canadian International Petroleum Conference, Jun. 12-14, 2007, and in oily water cleanup as described in U.S. Pat. No. 4,734,205.

U.S. Pat. No. 7,879,768 to An Ming Wu discloses that the hydrophobic group of hydrophobically associating polymers strongly adsorbs on the bitumen surfaces through its oil affinity force, and the hydrophilic groups of the hydrophobically associating polymers make the bitumen surface water wet and provides less sticking. Further, the hydrophobically associating polymers are claimed to effectively prevent bitumen from dispersing. Accordingly, these hydrophobically associating polymers are considered to be suitable bitumen and/or tar, flocculent and sticking inhibitors.

It is an object of the present invention to mitigate or obviate at least one of the above-mentioned disadvantages.

SUMMARY OF THE INVENTION

In one of its aspects, there is provided an anti-accretion drilling fluid additive comprising:

a hydrophobically modified polysaccharide.

In another of its aspects, there is provided a method for providing a method for limiting accretion on metal surfaces in contact with oil sand containing formation when operating a drilling assembly to drill a wellbore, the method having the steps of:

including a hydrophobically modified polysaccharide with an aqueous drilling fluid, wherein said hydrophobically modified polysaccharide comprises an effective amount of hydrophobic units attached to a natural polysaccharide; and circulating said aqueous drilling fluid through said wellbore.

In another of its aspects, there is provided a method for providing a method for limiting accretion on metal surfaces in contact with oil sand containing formation when operating a drilling assembly to drill a wellbore, the method having the steps of:

including a hydrophobically modified polysaccharide derivative with an aqueous drilling fluid, wherein said hydrophobically modified polysaccharide derivative is formed by reacting a natural polysaccharide with at least one derivatizing agent and attaching an effective amount of hydrophobic units to said polysaccharide derivative; and circulating said aqueous drilling fluid through said wellbore.

In another of its aspects, there is provided an aqueous drilling fluid for bitumen-containing formations comprising:

a natural polysaccharide with an effective amount of hydrophobic units attached thereto to form a hydrophobically modified polysaccharide, for limiting accretion of bitumen on metal surfaces of drilling equipment.

In another of its aspects, there is provided a method for drilling a wellbore through a formation comprising the steps of:

operating a drilling assembly to drill a wellbore; and circulating an aqueous-based drilling fluid through said wellbore as it is drilled, said aqueous-based drilling fluid comprising an anti-accretion additive comprising:

a hydrophobically modified polysaccharide formed by attachment of an effective amount of hydrophobic units to a natural polysaccharide, and wherein said hydrophobic unit is bound to said polysaccharide by an ether bond or an ester bond.

In another of its aspects, there is provided a method for limiting accretion on metal surfaces in contact with oil sand containing formation when operating a drilling assembly to drill a wellbore, the method having the steps of:

including a hydrophobically modified polysaccharide formed by attachment of an effective amount of hydrophobic units to a natural polysaccharide, and wherein said hydrophobic unit is bound to said polysaccharide by an ether bond or an ester bond; and protecting said metal surfaces from bitumen accretion while drilling with said aqueous drilling fluid.

While this application is not bound by any theory regarding the bitumen encapsulation and anti-accretion properties of hydrophobically modified polymers, it has been found that the hydrophobic modification of natural or modified natural polymers offers improved encapsulation and anti-accretion properties. Accordingly, the use of hydrophobically modified natural polymers or modified natural polymers constitutes a more environmentally friendly approach towards the containment of bitumen and/or heavy oil materials and limit accretion of bitumen and/or heavy oil materials on metal surfaces such as drill bits, drill string, drilling tools, liners, casings, surface equipment, and so forth.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

Figure 1:
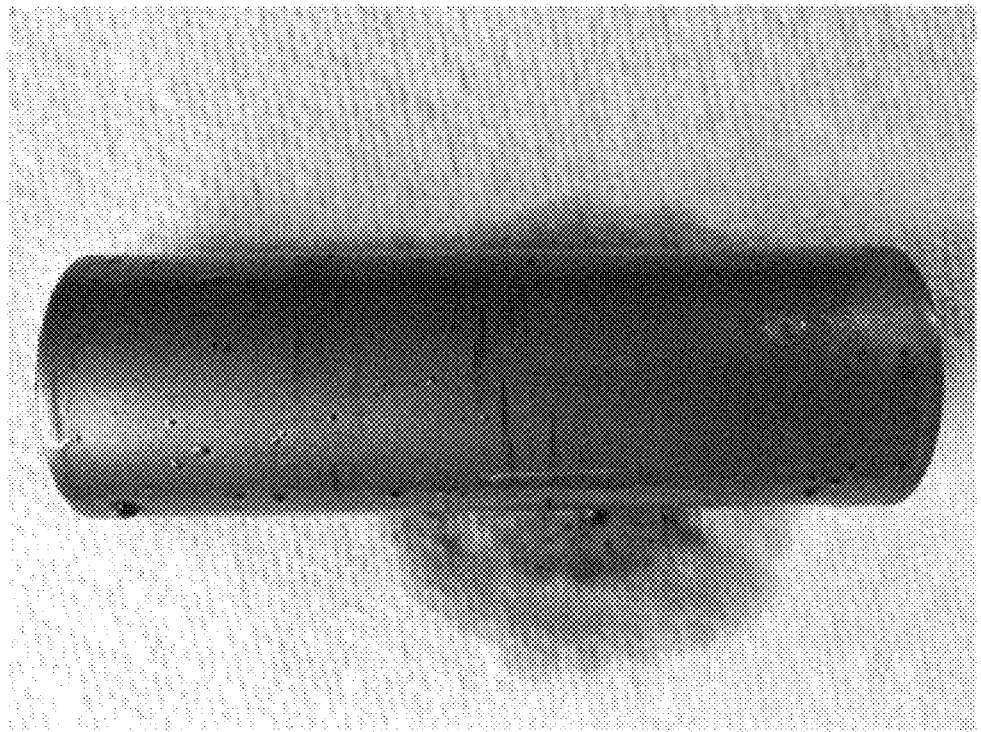
FIG. 1 is a photograph showing the condition of a carbon steel pipe after being placed in a cylinder filled with an aqueous drilling fluid comprising a first bitumen encapsulant, ESAFLOR® HM22, after rolling the cylinder continuously for 24 hours.
Figure 2:
FIG. 2 is a photograph showing the condition of a carbon steel pipe after being placed in a cylinder filled with an aqueous drilling fluid comprising a second bitumen encapsulant, NATROSOL™ 330PLUS, after rolling the cylinder continuously for 24 hours.
Figure 3:
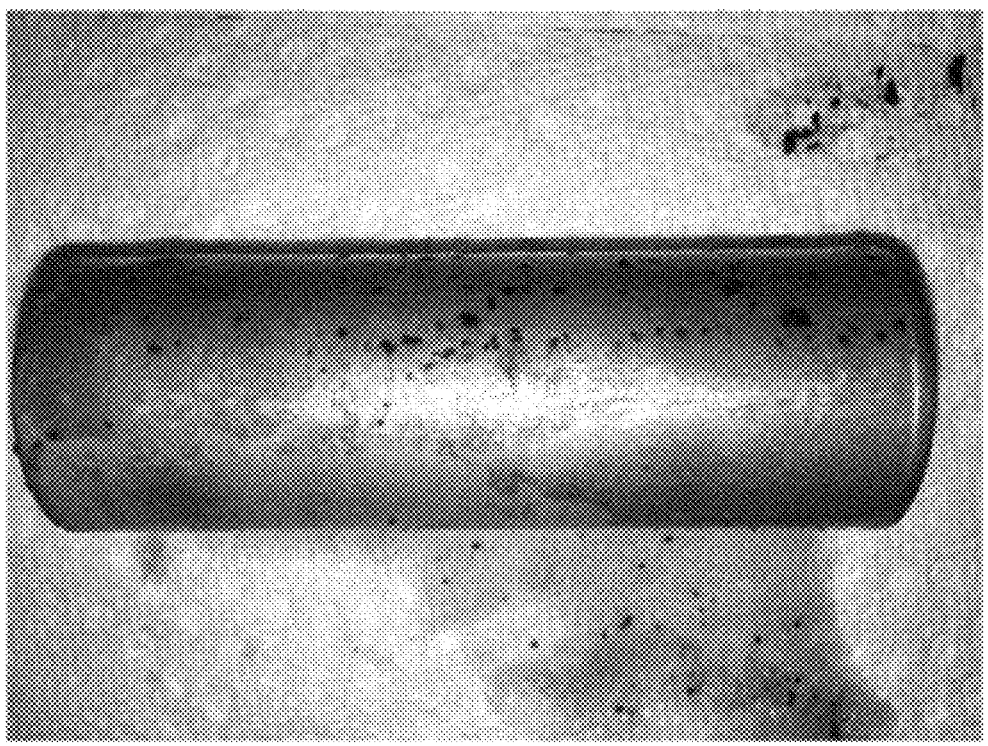
FIG. 3 is a photograph showing the condition of a carbon steel pipe after being placed in a cylinder filled with an aqueous drilling fluid comprising a third bitumen encapsulant, BERMOCOLL® EHM 500, after rolling the cylinder continuously for 24 hours.
Figure 4:
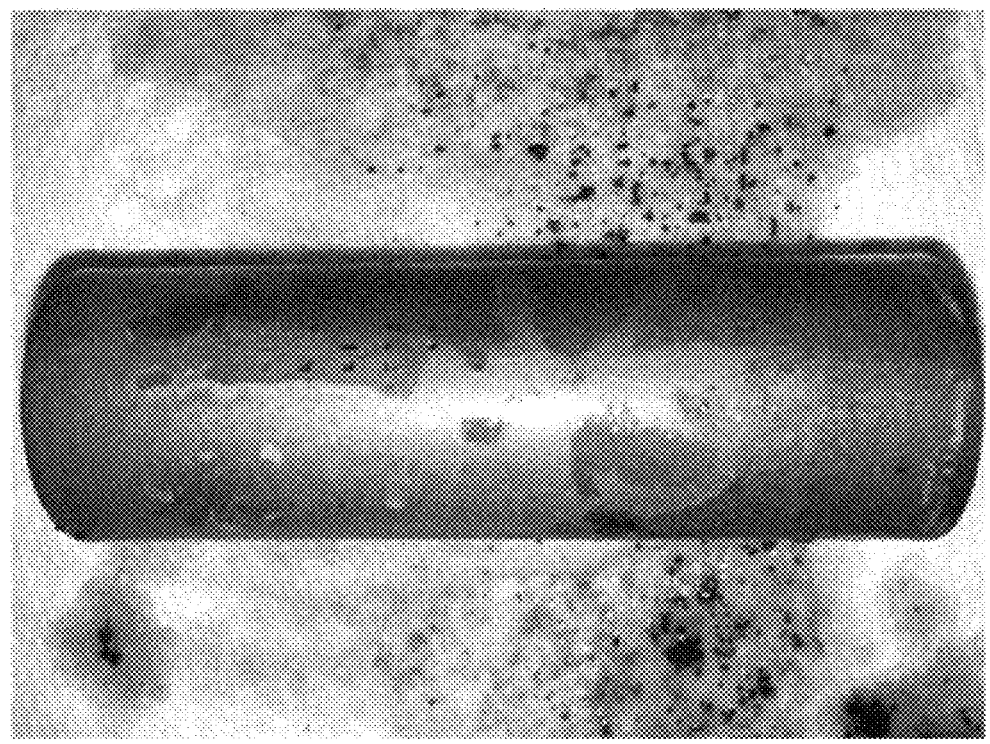
FIG. 4 is a photograph showing the condition of a carbon steel pipe after being placed in a cylinder filled with an aqueous drilling fluid comprising a fourth bitumen encapsulant, BERMOCOLL® EHM EXTRA, after rolling the cylinder continuously for 24 hours.
Figure 5:
FIG. 5 is a photograph showing the condition of a carbon steel pipe after being placed in a cylinder filled with an aqueous drilling fluid comprising a fifth bitumen encapsulant, BERMOCOLL® EHM 300, after rolling the cylinder continuously for 24 hours.
Figure 6:
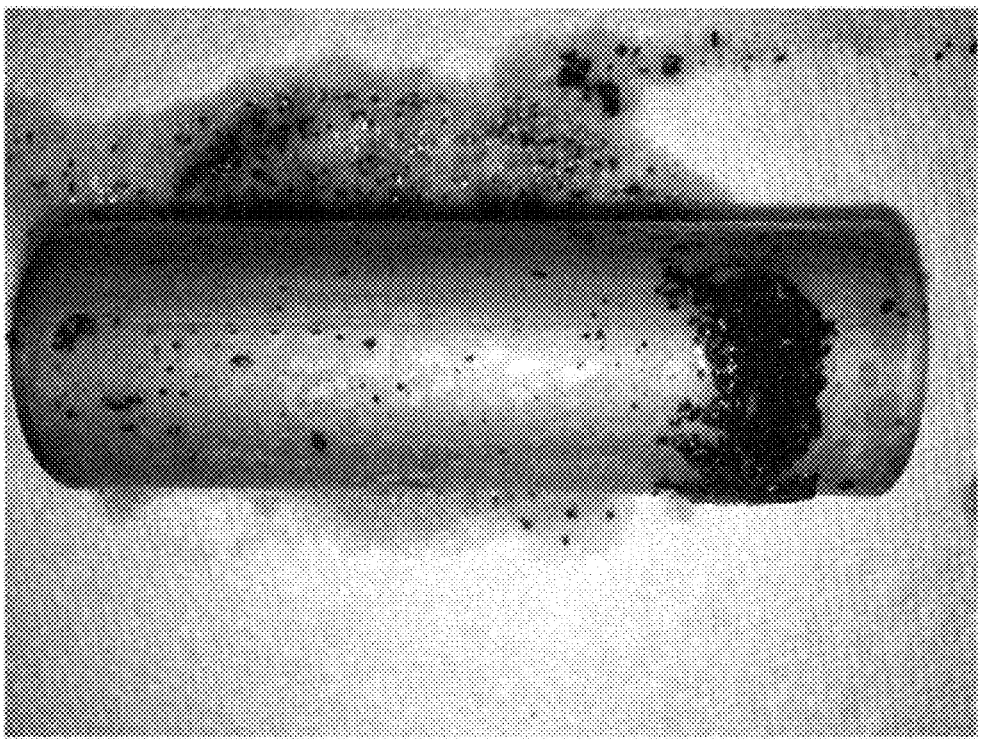
FIG. 6 is a photograph showing the condition of a carbon steel pipe after being placed in a cylinder filled with an aqueous drilling fluid comprising a sixth bitumen encapsulant, anionic polyacrylamide having an approximate molecular weight (mwt) of 15,000,000 and charge density of about 10%, after rolling the cylinder continuously for 24 hours.
Figure 7:
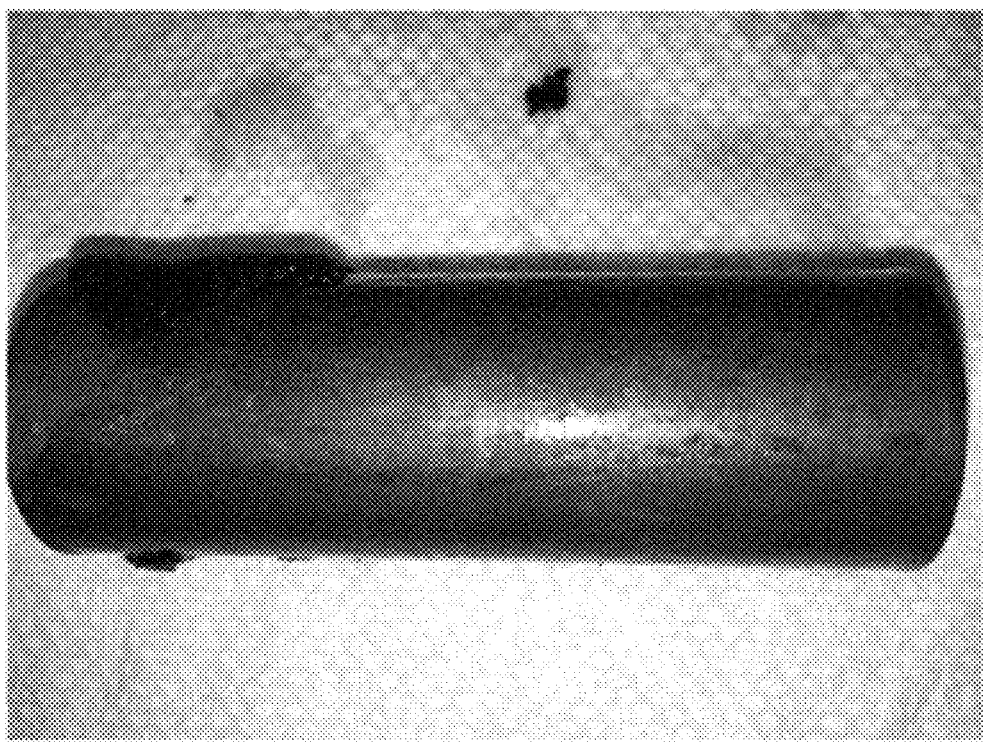
FIG. 7 is a photograph showing the condition of a carbon steel pipe after being placed in a cylinder filled with an aqueous drilling fluid comprising a seventh bitumen encapsulant, nonionic polyacrylamide having an approximate molecular weight (mwt) of 10,000,000 and charge density ranging from about 1% to about 3%, after rolling the cylinder continuously for 24 hours.

Polysaccharides are the most abundant natural polymers. They range in structure from linear to highly branched and include storage to structural varieties. Because of their natural structure, some polysaccharides have been used for the encapsulation of edible oils and spices. Modification of polysaccharides is a well-established method for enhancing their functional properties or for limiting their shortcomings. Polysaccharides can be carboxymethylated, alkoxylated or otherwise modified to increase their water solubility or to improve their overall functionality.

Hydrophobic modification of polysaccharides and derivatized polysaccharides leads to polymeric structures with enhanced functional properties. Entanglement of these polymeric structures through their hydrophobic moieties creates self-association of polymers with desirable rheological properties.

In one exemplary embodiment, hydrophobically modified natural polysaccharides or hydrophobically modified, chemically derivatized polysaccharides can be effectively used as bitumen encapsulants and thereby can provide an improved barrier against bitumen accretion during drilling in SAGD operations.

As used herein, polysaccharides are defined as polymeric carbohydrate molecules composed of long chains of monosaccharide units bound together by glycosidic linkages and on hydrolysis give the constituent monosaccharides or oligosaccharides.

Polysaccharides have a general formula of $C_6(H_{10}O_5)n$ where n ranges between 40 and 3000 and include callose or laminarin, chrysolaminarin, xylan, arabinoxylan, mannan, fucoidan and galactomannan. Definitions of how large a carbohydrate must be to fall into the categories of polysaccharide or oligosaccharide vary according to personal opinion. Well-known examples of polysaccharides are starches, cellulose, chitin, glycogens, pectins and most natural gums.

In one exemplary embodiment, derivatized polysaccharides include derivatives of polysaccharides made by reacting the polymers with various derivatizing agents, which react with the hydroxyl groups of the polymer to form ethers or esters. For example, hydroxyalkyl ethers of polygalactomannan polysaccharide are made by reacting alkylene oxides with the gums as disclosed in U.S. Pat. No. 3,483,121. The galactose and mannose sugar units of polygalactomannan polysaccharide each have an average of three reactive hydroxyl groups. These react with alkylene oxides to produce hydroxyalkyl ethers of the gums. Each unit of alkylene oxide added to the polygalactomannan polysaccharide in turn adds a new hydroxyl group which is itself reactive. Generally alkylene oxide is added to the polygalactomannan polysaccharide with a molar substitution (M.S.) ratio of 4 or 5.

Hydroxyethylcellulose (HEC) is another type of derivatized polysaccharide. Cellulose ethers are usually made by reacting alkali cellulose with ethylene oxide (EO). In general, the molar ratio of EO to the anhydroglucose units of cellulose is higher than 1.5 to provide adequate water solubility to the cellulose backbone. HEC is a water-soluble/water-swellable polymer that generally is used to viscosity aqueous media of functional systems.

Other widely used commercially available derivatized polysaccharides include nonionic water soluble polysaccharide ethers such as methylcellulose (MC), hydroxypropylmethylcellulose (HPMC), hydroxypropylcellulose (HPC), and ethylhydroxyethylcellulose (EHEC) and hydroxypropyl (HP) guar, hydroxyethyl guar, and HP starch and other nonionic starch and guar derivatives.

Anionic derivatized polysaccharides such as carboxymethylcellulose (CMC) and carboxymethylstarch (CMS) and cationic derivatized polysaccharides such as cationic chitosan and cationic guar gum are all considered chemically derivatized polysaccharides.

Hydrophobic modification of polysaccharides and water soluble derivatized polysaccharides subject to this application are defined as: oligosaccharides, polysaccharides and derivatized polysaccharides, as defined above, can be hydrophobically modified to enhance their desirable properties or limit their shortcomings. Hydrophobic modification is usually done via attachment of hydrophobic units to the selected polymer. The hydrophobic unit is bound to the selected polysaccharide by an ether or ester bond, preferably an ether bond as this type of bond is more stable when the polymer is in an aqueous solution.

The proportion of hydrophobic units may range from about 0.01% to about 10% by molar substitution (M.S.), preferably from about 0.05% to about 1.5% by M.S. and more specifically between about 0.1% and about 1% by M.S. Any water soluble polysaccharide or derivative can be used as the backbone to form the hydrophobically modified polysaccharide, such as HEC, HPC, MC, HPMC, EHEC, and methylhydroxyethylcellulose (MHEC). Other exemplary cellulose derivatives such as CMC and, agar, dextran, locust bean gum, starch, guar and their derivatives can also be modified. The amount of substituent such as methyl, hydroxyethyl, hydroxypropyl or carboxymethyl is chosen such that there is an effective amount for the derivatized polymer to be water soluble.

The hydrophobic unit may be any aliphatic chain epoxy compound which contains about 8 to about 28 carbon atoms in the alkyl group. Examples of such epoxy compounds are 1,2-epoxyoctane, 1,2-epoxy dedicate, 1,2-epoxyhexadecane, 1,2-epoxytetracosane, and the like. Other useful long chain epoxy compounds include glycidyl ethers of aliphatic alcohols wherein the aliphatic alcohols contain about 5 to about 25 carbon atoms. Examples of such glycidyl ethers include, but are not limited to, glycidyl ethers of amyl alcohol, hexanol, octanol, lauryl alcohol, stearyl alcohol, lignoceryl alcohol and the like. Examples of suitable alkyl halides include, but are not limited to, octyl chlorides, decyl bromide, dodecyl iodide, hexadecyl bromide, and the like.

Some products may be referred to as being "long chain alkylaryl group modified," it will be recognized that except in the case where modification is effected with an alkyl halide, the modifier is not a simple long chain alkylaryl group. The group may actually be a hydroxyalkyl radical in the case of a glycidyl ether, a urethane radical in the case of an isocyanate, or an acyl radical in the case of an acid or acyl chloride. Nonetheless, the terminology "long chain alkylaryl group" may be used and the number of carbon atoms may refer only to those carbon atoms in the hydrocarbon portion of the modifying molecule, excluding any carbon atoms in the connecting groups. Thus, hydroxyethylcellulose modified by reaction with nonylphenyl glycidyl ether is termed a $C_{15}$ hydrophobic group ($C_6+C_9$) modification of hydroxyethylcellulose.

Processes for preparing polysaccharides, such as cellulose, starch, and guar, having hydrophobic substituents are known in the art and are not part of this application.

In accordance with one aspect of the invention, at least one hydrophobically modified polysaccharide or a derivatized polysaccharide is added to a water based drilling fluid to provide improved encapsulation efficiency of bitumen. It should be understood that the number and type of hydrophobically modified polysaccharides and/or derivatized polysaccharides that can be incorporated in the drilling fluid is not limited as long as they remain water soluble. As many polymers as practically feasible may be added and mixed simultaneously or sequentially. For the purpose of this invention, water solubility is defined as a minimum solubility of 0.1 gram per 100 grams of water at ambient temperature.

From a practical point of view, the hydrophobically modified polysaccharide(s) or derivatized polysaccharide(s) can be added to the water based SAGD drilling fluid in quantities of between 0.01% by weight to 10% by weight of the total fluid with the more preferred amount being 0.05% to 5% and the most preferred quantity being from 0.1% to 1% by weight.

The water based SAGD drilling fluid may or may not include other materials including but not limited to rheology modifiers, gelling agents, fluid loss control agents, acid and/or alkalinity control agents, lost circulation materials, wetting agents, surfactants, thinners, etc. Commercially available materials used as a non-limiting part of the present embodiment and may be incorporated into the SAGD drilling fluid for the purpose of encapsulating the bitumen and/or providing the anti-accretion properties include but are not limited to: ESAFLOR® HM22, a hydrophobically modified hydroxypropyl guar from Lamberti SA, Italy; NATROSOL™ 330PLUS a hydrophobically modified hydroxyethyl cellulose from Ashland Inc., New Jersey, U.S.A.; BERMOCOLL® EHM (grades 200, 300, 500 and Extra) which are hydrophobically modified ethylhydroxyethyl cellulose in different molecular weights from AkzoNobel, Amsterdam, the Netherlands.

Example 1: Bitumen Accretion Testing

Unless otherwise indicated, this example is based on the following test procedure, which was developed to replicate dispersion of bitumen while drilling and accretion of bitumen onto metal surfaces. In the test procedure, seven (7) cylinders were filled with 300 ml of water, 0.5 grams of xanthan gum, and 0.3 grams of various commercially available hydrophobically modified chemically derivatized polysaccharides (Sample Nos. 1 to 7, as identified in Table 1); and one (1) cylinder was filled with only 300 ml of water, 0.5 grams of xanthan gum (Sample No. 8).

Eight (8) ¾" carbon steel pipe sections 10 cm in length were placed in each cylinder. 100 grams of bitumen was then added to each of the eight (8) cylinders. The cylinders were rolled for 24 hours and then the pipes were removed for visual examination of bitumen accretion. The following Table 1 summarizes the results of the visual examination of the pipes.

Table 1: shows the results after each carbon steel pipes is placed in a cylinder with an aqueous drilling fluid with one of the bitumen encapsulants (Sample Nos. 1 to 8), and after rolling the cylinder continuously for 24 hours.

| Sample No. | Bitumen Encapsulants | Pipe Appearance After 24 Hours Of Rolling |
|---|---|---|
| 1 | ESAFLOR HM22 | Clean |
| 2 | NATROSOL 330PLUS | Clean |
| 3 | BERMOCOLL EHM 500 | Clean |
| 4 | BERMOCOLL EHM EXTRA | Clean |
| 5 | BERMOCOLL EHM 300 | Clean |
| 6 | Anionic polyacrylamide - approx. mwt. of 15,000,000 and charge density of 10% | Some bitumen accretion |
| 7 | Nonionic polyacrylamide - approx. mwt. of 10,000,000 and charge density of 1 to 3% | Some bitumen accretion |
| 8 | Blank | Severe bitumen accretion |

Figure 8:
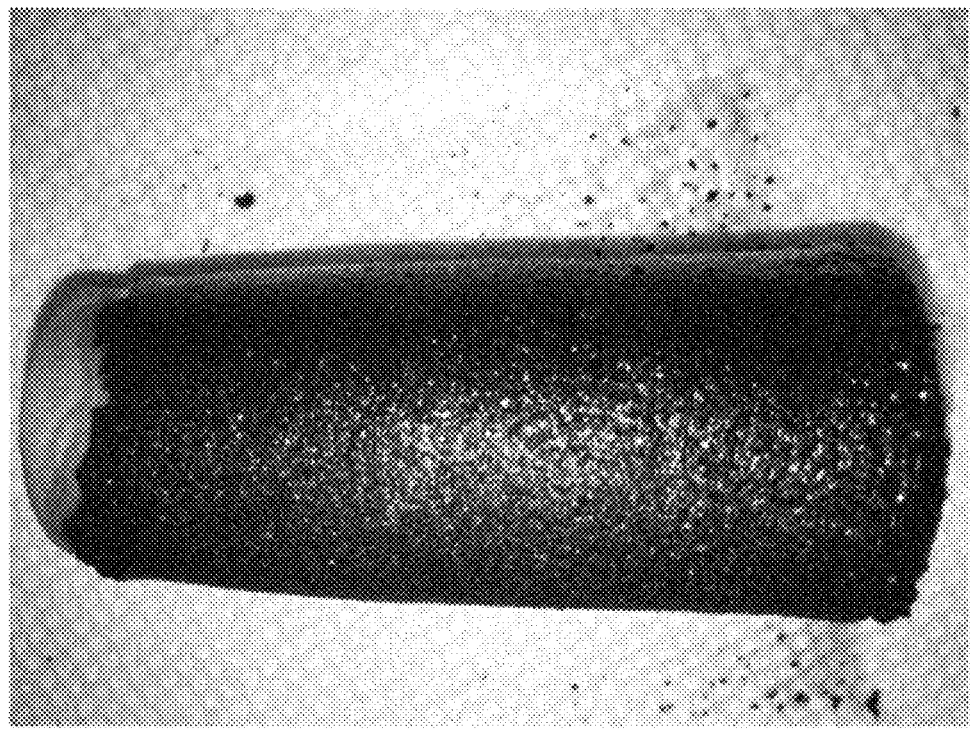
FIG. 8 is a photograph showing the condition of a carbon steel pipe after being placed in a cylinder filled with an aqueous drilling fluid without any bitumen encapsulant after rolling the cylinder continuously for 24 hours.

The condition of each carbon steel pipe after being placed in a cylinder filled with an aqueous drilling fluid comprising Sample Nos. 1 to 8, and after rolling the cylinder continuously for 24 hours, are shown in the photographs of FIGS. 1 to 8, respectively. As can be seen in FIGS. 1 to 5, carbon steel pipes in Sample Nos. 1 to 5 are substantially free of any bitumen accretion, while those carbon steel pipes in Sample Nos. 6 and 7 show some bitumen accretion (FIGS. 6 and 7), and the carbon steel pipe in Sample No. 8 shows severe bitumen accretion (FIG. 8).

Various modifications to those embodiments will be readily apparent to those skilled in the art, and the generic principles defined herein may be applied to other embodiments. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or device that comprises a list of elements does not include only those elements but may include other elements not expressly listed or inherent to such process, method, article, or device. Further, no element described herein is required for the practice of the invention unless expressly described as "essential" or "critical."

The invention claimed is:

1. An anti-accretion drilling fluid additive comprising:
a hydrophobically modified polysaccharide, wherein said polysaccharide is modified by attachment of an effective amount of hydrophobic units to said polysaccharide, and wherein said hydrophobic unit is bound to said polysaccharide by an ether bond or an ester bond; wherein said effective amount ranges from 0.01% to 10% by molar substitution (M.S.); and
wherein said hydrophobic units are chosen from a group consisting of: aliphatic chain epoxy compounds which includes 8 to 28 carbon atoms in the alkyl group, comprising 1,2-epoxyoctane, 1,2-epoxy dedicate, 1,2-epoxyhexadecane, 1,2-epoxytetracosane; long chain epoxy compounds comprising glycidyl ethers of aliphatic alcohols wherein the aliphatic alcohols contain 5 to 25 carbon atoms.

2. The anti-accretion drilling fluid additive of claim 1, wherein said hydrophobically modified polysaccharide comprises a natural polysaccharide including polymeric carbohydrate molecules composed of long chains of monosaccharide units bound together by glycosidic linkages and forms constituent monosaccharides or oligosaccharides following hydrolysis.

3. The anti-accretion drilling fluid additive of claim 2, wherein said polysaccharide has a general formula of $C_6(H_{10}O_5)_n$ where n ranges from 40 to 3000.

4. The anti-accretion drilling fluid additive of claim 3, wherein said polysaccharide comprises at least one of a starch, cellulose, chitin, glycogen, pectin and a natural gum.

5. The anti-accretion drilling fluid additive of claim 3, wherein said polysaccharide is chosen from a group consisting of: callose, laminarin, chrysolaminarin, xylan, arabinoxylan, mannan, fucoidan and galactomannan.

6. The anti-accretion drilling fluid additive of claim 3, wherein said polysaccharide is reacted with at least one derivatizing agent to form a derivatized polysaccharide, such that hydroxyl groups of polysaccharides react with said at least one derivatizing agent to form hydroxyl ethers or esters.

7. The anti-accretion drilling fluid additive of claim 6, wherein said derivatized polysaccharide includes hydroxyalkyl ethers of polygalactomannan polysaccharide.

8. The anti-accretion drilling fluid additive of claim 7, wherein said hydroxyalkyl ethers are made by reacting alkylene oxides with at least one natural gum.

9. A method for limiting accretion on metal surfaces in contact with oil sand containing formation when operating a drilling assembly to drill a wellbore, the method having the steps of:
including a hydrophobically modified polysaccharide with an aqueous drilling fluid, wherein said hydrophobically modified polysaccharide comprises an effective amount of hydrophobic units attached to a natural polysaccharide to form said hydrophobically modified polysaccharide, for limiting accretion of bitumen on said metal surfaces; and
circulating said aqueous drilling fluid through said wellbore; and
wherein said effective amount of the said polysaccharide ranges from 0.01% to 10% by molar substitution (M.S.).

10. The method of claim 9, wherein at least of one of said polysaccharide and a derivative of said polysaccharide is water soluble.

11. The method of claim 10, wherein at least one of said polysaccharide and said water soluble derivative of said polysaccharide is used as a backbone to form said hydrophobically modified polysaccharide.

12. A method for limiting accretion on metal surfaces in contact with oil sand containing formation when operating a drilling assembly to drill a wellbore, the method having the steps of:
including a hydrophobically modified polysaccharide derivative with an aqueous drilling fluid, wherein said hydrophobically modified polysaccharide derivative is formed by reacting a natural polysaccharide with at least one derivatizing agent and attaching an effective amount of hydrophobic units to said polysaccharide derivative;
circulating said aqueous drilling fluid through said wellbore;
wherein said effective amount ranges from 0.01% to 10% by molar substitution (M.S.);
wherein said polysaccharide derivative is formed by reacting said derivatizing agent with the hydroxyl groups of the polysaccharide to form hydroxyl ethers or esters;
wherein said polysaccharide derivative includes hydroxyalkyl ethers of polygalactomannan polysaccharide; and
wherein said hydroxyalkyl ethers are made by reacting alkylene oxides with at least one of a plurality of gums.

13. The method of claim 12, wherein said polygalactomannan polysaccharide comprises galactose and mannose sugar units having an average of three reactive hydroxyl groups which react with alkylene oxides to produce hydroxyalkyl ethers of the gums.

14. The method of claim 13, wherein each unit of said alkylene oxide added to the polygalactomannan polysaccharide in turn adds a new hydroxyl group which is itself reactive, and wherein amount of said alkylene oxide added to said polygalactomannan polysaccharide includes a molar substitution of 4 or 5.

15. The method of claim 12, wherein said polysaccharide derivative includes hydroxyethylcellulose (HEC).

16. The method of claim 15, wherein said hydroxyethylcellulose is made by reacting alkali cellulose with ethylene oxide (EO).

17. The method of claim 16, wherein the molar ratio of EO to anhydroglucose units of cellulose is higher than 1.5 to provide adequate water solubility to said HEC.

18. The method of claim 12, wherein said polysaccharide derivative includes nonionic water soluble polysaccharide ethers.

19. The method of claim 12, wherein said polysaccharide derivative includes nonionic water soluble polysaccharide ethers.

20. The method of claim 19, wherein said nonionic water soluble polysaccharide ethers are chosen from a group consisting of: methyl cellulose (MC), hydroxypropylmethylcellulose (HPMC), hydroxypropylcellulose (HPC), and ethylhydroxyethylcellulose (EHEC) and hydroxypropyl (HP) guar, hydroxyethyl guar, and HP starch.

* * * * *